H. D. WENDT.
REMOVABLE CALK FOR HORSESHOES.
APPLICATION FILED JULY 21, 1910.
992,090.
Patented May 9, 1911.
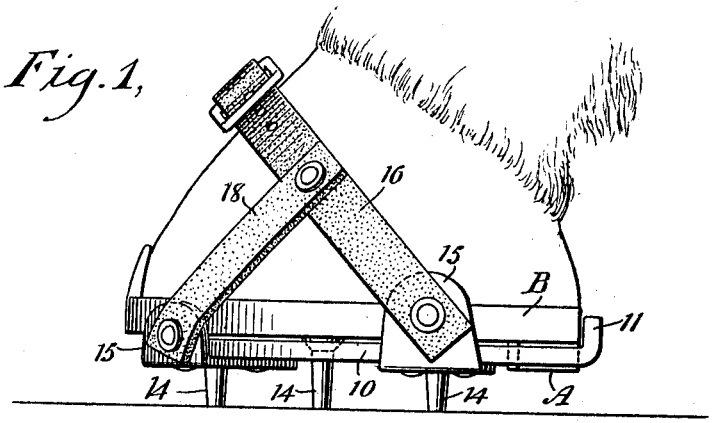
Fig. 1,
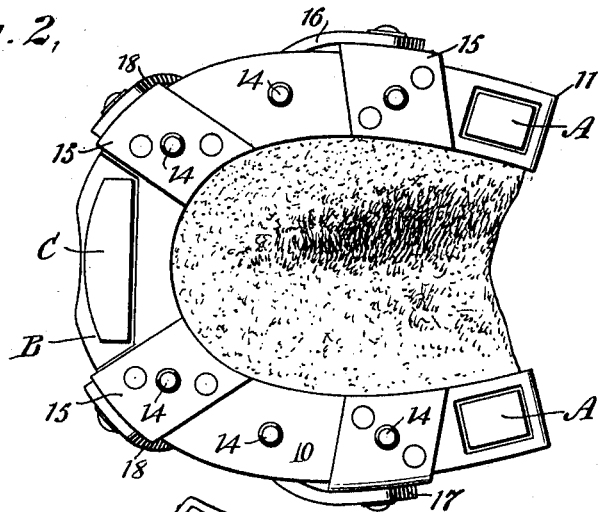
Fig. 2,
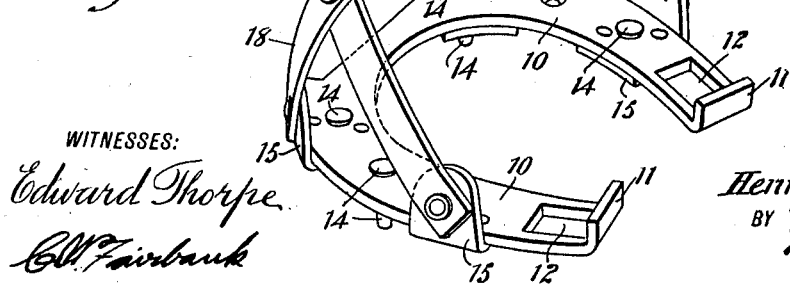
Fig. 3,
Fig. 4.
WITNESSES:
Edward Thorpe
C. W. Fairbank
INVENTOR
Henry D. Wendt
BY
Munn & Co
ATTORNEYS
THE NORRIS PETERS CO., WASHINGTON, D. C.

UNITED STATES PATENT OFFICE.

HENRY D. WENDT, OF HOBOKEN, NEW JERSEY.

REMOVABLE CALK FOR HORSESHOES.

992,090. Specification of Letters Patent. Patented May 9, 1911.

Application filed July 21, 1910. Serial No. 573,028.

*To all whom it may concern:*

Be it known that I, HENRY D. WENDT, a citizen of the United States, and a resident of Hoboken, in the county of Hudson and State of New Jersey, have invented a new and Improved Removable Calk for Horseshoes, of which the following is a full, clear, and exact description.

This invention relates to certain improvements in removable horseshoe calks, adapted for use in connection with the ordinary form of horseshoe to prevent the horse from slipping on icy or slippery ground.

In my improved construction, I employ a calk-bearing plate of substantially the same general form as the horseshoe, and this plate is so constructed that it engages with the shoe to prevent any lateral movement of the calk-bearing plate, and is clamped over the hoof in such a manner that no portion of the clamping means comes adjacent the rear and tender side of the hoof. The calks proper are removable from the plate, and may be readily replaced when worn or broken.

Reference is to be had to the accompanying drawings, forming a part of this specification, in which similar characters of reference indicate corresponding parts in all the figures, and in which—

Figure 1 is a side elevation of a device constructed in accordance with my invention, and illustrated as applied to the hoof; Fig. 2 is an inverted plan view of the parts shown in Fig. 1; Fig. 3 is a perspective view of my improved device removed from the hoof and shoe; and Fig. 4 is a perspective view of one of the calks.

My improved device includes a calk-bearing plate 10, which is preferably of substantially the same general shape as the horseshoe, and adapted to engage with the under surface of the latter. The calk-bearing plate at the rear ends of its two side portions is provided with upwardly-turned flanges 11, which may engage with the rear ends of the horseshoe, so as to prevent the calk-bearing plate from slipping forwardly. Directly in advance of these flanges, are openings 12, which may receive the downturned heel calks A on the shoe proper B. The engagement of these calks A within the openings 12, prevents forward, rearward or lateral movement of the calk-bearing plate in respect to the shoe. The plate 10, at its front edge, is cut away so as to leave a space for the toe-calk C of the horseshoe, and the plate engages with the rear surface of this toe-calk, so as to additionally prevent forward movement of the calk-bearing plate. The plate is provided with a series of apertures 13 therein, along opposite sides, and within each of these apertures there is inserted a removable calk 14, preferably of the form illustrated in Fig. 4. Each aperture 13 is countersunk, and each calk is provided with a head, which will fit into this countersunk portion, so as to lie substantially flush or slightly above the upper surface of the calk-bearing plate. The calks are thus prevented from falling out through the apertures, and, at the same time, are rigidly held in place.

For securing the calk-bearing plate to the horseshoe, the plate has riveted thereto, upon opposite sides, bracket members 15, each of which may be formed of a metal plate bent to form a portion for engagement with the under surface of the plate 22, and a portion extending upwardly at right angles thereto for engagement with the outer edge of the plate and with the outer edge of the horseshoe. These brackets may be secured in place in any suitable manner, as, for instance, by suitable rivets. There are two of these brackets upon each side, and from the two rear brackets, straps 16 and 17 extend upwardly and forwardly so as to permit of their being buckled together upon the front of the hoof at a considerable distance above the shoe. Preferably, these straps extend upwardly and forwardly at an angle of about 45 degrees. From each forward bracket, a strap 18 extends upwardly and rearwardly, the lower end of the strap being secured to the bracket and the upper end of the strap being secured to the adjacent first-mentioned strap.

In fastening the device on the hoof, it is merely necessary to place the plate in engagement with the under side of the shoe with the heel calks of the latter extending down through the openings 12 in the plate. Upon buckling the straps 16 and 17, the device will be drawn forwardly, so that the flanges 11 will engage with the rear ends of the shoe and the front of the plate will engage with the rear side of the toe calk. The strain exerted on the device as the horse pulls, will tend to move the shoe rearwardly in respect to the plate, and the toe calks, the heel calks and the flanges 11 resist this rearward movement. The only strain upon the straps is that necessary to hold the device firmly in place.

Having thus described my invention, I claim as new and desire to secure by Letters Patent:

A device of the class described, including a plate adapted for engagement beneath the under surface of the shoe and of the same general form as the shoe, said plate being provided with a recess at its front edge adapted to receive the toe calk of the shoe and engage with the rear side of the latter, and having apertures adjacent the rear ends and adapted to receive the heel calks of the shoe, said plate being further provided with rear ends bent upwardly, brackets separate from said plate and secured against the under side thereof, said brackets having upturned portions engaging the outer edge of the shoe, straps connected with said upturned portions and adapted to be secured together in front of the hoof above the shoe, and calks removably carried by said plate and extending through said brackets and having heads disposed between said plate and the shoe.

In testimony whereof I have signed my name to this specification in the presence of two subscribing witnesses.

HENRY D. WENDT.

Witnesses:
CLAIR W. FAIRBANK,
PHILIP D. ROLLHAUS.

---

Copies of this patent may be obtained for five cents each, by addressing the "Commissioner of Patents, Washington, D. C."